US009604785B1

(12) United States Patent
Gaerke

(10) Patent No.: US 9,604,785 B1
(45) Date of Patent: Mar. 28, 2017

(54) TELESCOPING FLOW CONTROL DISCHARGE SPOUT ASSEMBLY FOR A CONVEYOR OF GRANULAR MATERIAL

(71) Applicant: J. & M. Manufacturing Co., Inc., Fort Recovery, OH (US)

(72) Inventor: Joshua P. Gaerke, Fort Recovery, OH (US)

(73) Assignee: J. & M. Manufacturing Co., Inc., Fort Recovery, OH (US)

( * ) Notice: Subject to any disclaimer, the term of this patent is extended or adjusted under 35 U.S.C. 154(b) by 0 days.

(21) Appl. No.: 15/017,951

(22) Filed: Feb. 8, 2016

(51) Int. Cl.
| | |
|---|---|
| *B65G 21/14* | (2006.01) |
| *B65G 17/28* | (2006.01) |
| *B65G 11/14* | (2006.01) |
| *B65G 11/02* | (2006.01) |
| *B65G 11/12* | (2006.01) |
| *B65G 37/00* | (2006.01) |
| *B60P 1/40* | (2006.01) |

(52) U.S. Cl.
CPC .............. *B65G 11/146* (2013.01); *B60P 1/40* (2013.01); *B65G 11/026* (2013.01); *B65G 11/126* (2013.01); *B65G 37/00* (2013.01); *B65G 2201/042* (2013.01); *B65G 2812/014* (2013.01); *B65G 2812/08* (2013.01)

(58) Field of Classification Search
CPC ........ B65G 33/14; B65G 33/22; B65G 33/00; B60P 1/42; B60P 43/073; A01F 12/45; A01D 90/10
USPC ......... 198/536, 588, 812; 414/335, 505, 523
See application file for complete search history.

(56) References Cited

U.S. PATENT DOCUMENTS

| | | | | |
|---|---|---|---|---|
| 3,168,946 A | * | 2/1965 | Gay ..................... | B65G 11/146 193/6 |
| 5,343,995 A | * | 9/1994 | Scarrow ............. | B65G 69/0441 198/311 |
| 6,296,435 B1 | * | 10/2001 | Wood ........................ | B60P 1/42 198/536 |
| 6,497,546 B2 | * | 12/2002 | Wood ........................ | B60P 1/42 198/536 |
| 6,974,021 B1 | * | 12/2005 | Boevers ............. | A01D 41/1217 198/550.2 |
| 7,644,816 B2 | * | 1/2010 | Veiga Leal ........ | A01D 41/1217 193/22 |

(Continued)

*Primary Examiner* — James R Bidwell
(74) *Attorney, Agent, or Firm* — Jacox, Meckstroth & Jenkins

(57) ABSTRACT

An auger conveyor for granular material or grain has a discharge outlet portion which pivotally supports a tubular inner spout section of a telescoping spout assembly. The inner spout section is pivoted by a remotely controlled actuator between an outwardly projecting upper discharge position and a downwardly projecting lower discharge position. The assembly includes an outer tubular spout section supported by the inner spout section for telescoping movement on the inner spout section, and an actuator in the form of an elongated link member pivotally connects the outer spout section to the conveyor outlet portion to produce the telescoping movement of the outer spout section in response to pivoting of the inner spout section. The spout assembly maintains a substantially constant vertical height while moving between the upper and lower discharge positions to avoid interference with a container receiving the grain.

17 Claims, 1 Drawing Sheet

(56) References Cited

U.S. PATENT DOCUMENTS

| | | | |
|---|---|---|---|
| 7,938,613 B2* | 5/2011 | Yoder | A01D 41/1217 |
| | | | 198/550.1 |
| 9,113,598 B2* | 8/2015 | Wood | A01D 90/10 |
| 2006/0016164 A1* | 1/2006 | Debruycker | A01D 41/1217 |
| | | | 56/14.6 |
| 2008/0006512 A1* | 1/2008 | Kuhus | B65G 33/00 |
| | | | 198/670 |
| 2008/0149463 A1* | 6/2008 | McCully | B65G 33/08 |
| | | | 198/531 |
| 2009/0272619 A1* | 11/2009 | Leal | A01D 41/1217 |
| | | | 193/4 |

* cited by examiner

TELESCOPING FLOW CONTROL DISCHARGE SPOUT ASSEMBLY FOR A CONVEYOR OF GRANULAR MATERIAL

BACKGROUND OF THE INVENTION

The present invention relates to a remotely controlled pivotal discharge spout for an auger conveyor projecting from a grain wagon or cart such as disclosed in U.S. Pat. No. 6,296,435 and U.S. Pat. No. 6,497,546 which issued to the assignee of the present invention and the disclosures of which are herein incorporated by reference. In such a discharge spout, it is highly desirable to provide for significantly increasing the horizontal or lateral reach of the spout when the spout is pivoted upwardly to its upper discharge position. It has also been found desirable to avoid changing the height of the bottom of the pivotal spout when the spout is pivoted downwardly to its downward discharge position in order to accommodate different environments and situations while using the pivotal spout on a grain cart, combine or seed tender. It is further desirable to control pivoting of the spout remotely by the operator, such as a tractor driver, while grain is being discharged from the conveyor, as disclosed in the '546 Patent.

SUMMARY OF THE INVENTION

The present invention is directed to a new telescoping spout assembly of the general type of the spout assemblies disclosed in the above patents and which is ideally suited for distributing grain from an inclined discharge auger conveyor of a grain cart and which provides for significantly increasing the side reach of the discharge spout without significantly increasing or decreasing the height of the bottom end of the spout as the spout is pivoted between its upper discharge position and its lower discharge position for distributing grain back and forth across a container such as a semi-trailer which commonly receives grain from a grain cart.

In the illustrated embodiment of the invention, a tubular inner spout section is pivotally connected to the discharge end portion of the housing of an auger conveyor, and the pivoting of the inner spout section is produced by an actuator, such as a hydraulic cylinder remotely controlled, as disclosed in the above '435 and '546 Patents. In accordance with the present invention, a tubular outer spout section is supported by the inner spout section for telescopic movement between a retracted position and an extended position relative to the inner spout section. The telescopic movement of the outer spout section is produced by an actuator, preferably in the form of a pair of elongated link members having outer end portions pivotally connected to the outer spout section and opposite end portions pivotally connected to the conveyor housing.

As the inner spout section is pivoted between its upper and lower discharge positions, the outer spout section automatically telescopes between its extended position and retracted position. Thus, the outer spout section is in its extended position when the inner spout section is pivoted to its upper position so that the spout assembly provides for distributing grain at a greater distance outwardly from the upper end portion of the conveyor. As the outer spout section telescopes to its retracted position when the inner spout section is pivoted to its downwardly projecting position, the bottom end of the outer spout does not move downwardly to interfere with the container receiving the grain, such as a side wall of a semi trailer. As a result, the grain cart and the tow tractor may be moved along the container or semi-trailer receiving the grain without the discharge spout assembly contacting with the grain receiving container or trailer.

Other features and advantages of the invention will be apparent from the following description, the accompanying drawing and the appended claims.

DESCRIPTION OF THE PREFERRED EMBODIMENT

Figure 1:
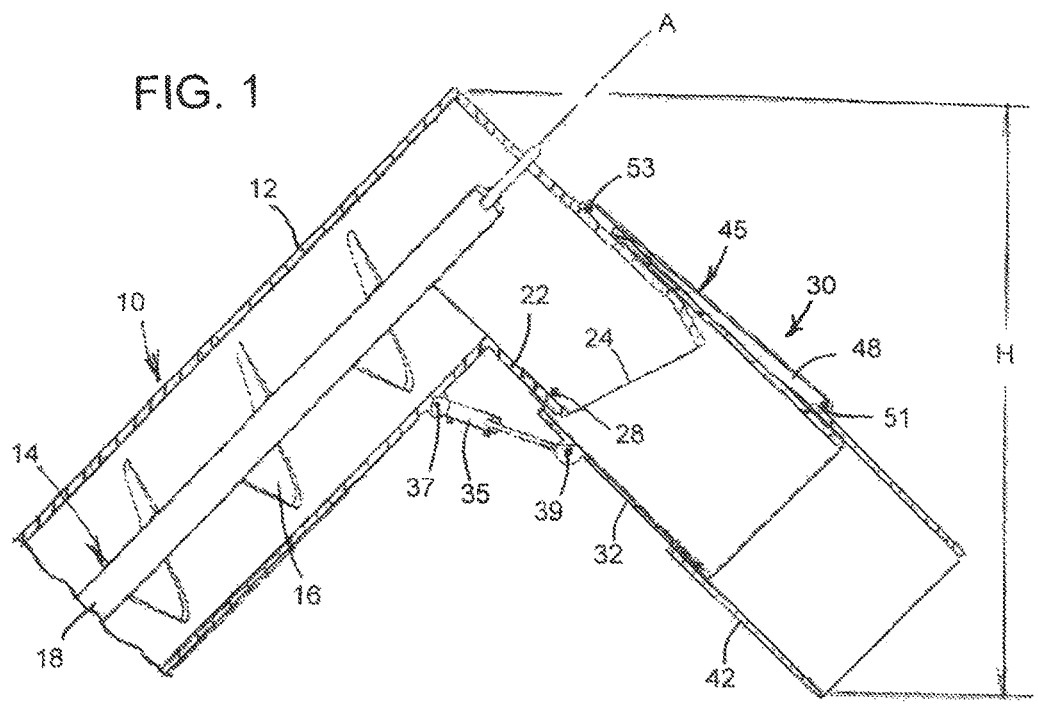
FIG. 1 is a vertical section through an upper end portion of an auger conveyor and also through a telescoping discharge spout assembly constructed in accordance with the invention and in its upper extended discharge position.

FIG. 1 illustrates the upper end portion of a conveyor 10 in the form of an inclined grain unloading auger conveyor, as shown in the above '546 Patent, and including a tubular or cylindrical housing 12 enclosing an auger 14 having a helical flight 16 surrounding a center shaft 18 with an axis A. The upper end portion of the conveyor 10 has a tubular discharge portion 22 defining a rectangular outlet 24. The discharge portion 22 projects laterally or downwardly from the housing 12 and at a substantial angle relative to the axis A of the auger 14. The discharge outlet portion 22 of the housing 12 is preferably rectangular in cross-section and supports a cross shaft 28 having outwardly projecting end portions which pivotally support a telescoping spout assembly 30. The assembly includes a tubular inner spout section 32 which surrounds the discharge portion 22 of the housing 12 and is pivotally supported by opposite end portions of the shaft 28. Preferably, the inner spout section 32 is rectangular in cross-section and closely surrounds the discharge portion 22 of the housing 12.

Figure 2:
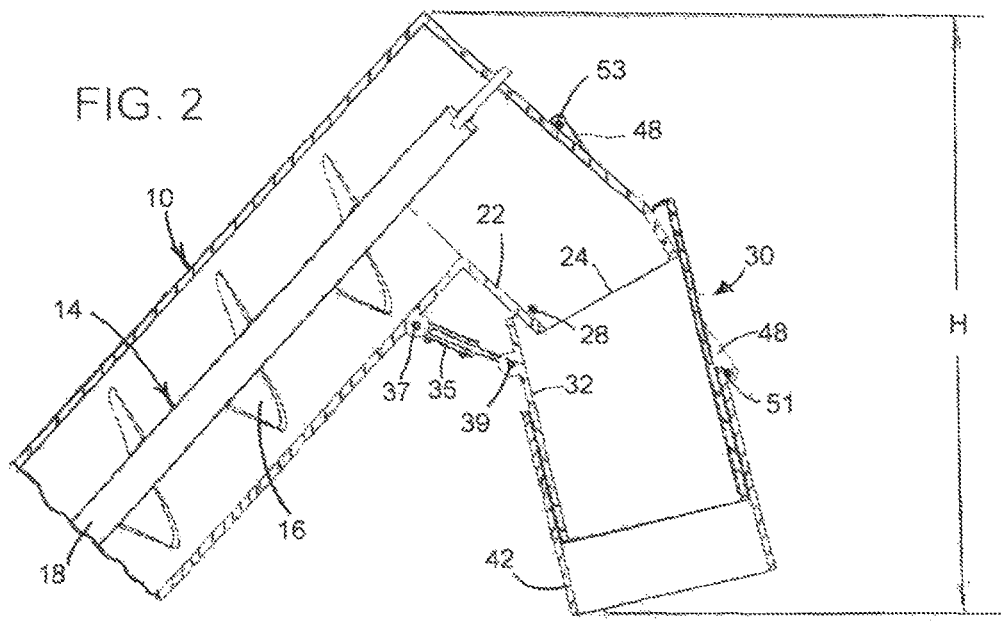
FIG. 2 is a vertical section similar to FIG. 1 and showing the telescoping spout assembly in its downwardly projecting and retracted discharge position.

An actuator 35, preferably in the form of a hydraulic cylinder, is pivotally connected to the conveyor housing 12 by a cross pin 37 and is pivotally connected to the inner spout section 32 by a pivot pin 39. Operation of the remotely controlled actuator 35 is effective to pivot the inner spout section 32 between an upper inclined grain discharge position (FIG. 1) and a downwardly projecting grain discharge position (FIG. 2). Preferably, the actuator 35 is controlled remotely by the operator within the tow vehicle or tractor, as described in the '435 and '546 Patents.

In accordance with the present invention, a tubular outer spout section 42 is slidably supported by the tubular inner spout section 32 for telescopic movement between an extended position (FIG. 1) and a retracted position (FIG. 2). Preferably, the outer spout section 42 also has a rectangular cross-section profile and closely surrounds the inner spout section 32. Nylon glides may be used in between the two spout sections 32 and 42 to provide for smoother sliding. A second actuator 45 operates to slide the outer spout section 42 on the inner spout section 32. Preferably, the actuator 45 comprises a pair of elongated link members 48 having corresponding outer end portions pivotally connected to the outer spout section 42 by a cross shaft 51 secured to the spout section 42. Upper end portions of the link members 48 are pivotally connected to opposite ends of a cross shaft 53 secured to the upper end of the conveyor housing 12.

As apparent from FIGS. 1 & 2, when the inner spout section 32 is pivoted from its upper discharge position (FIG.

1) to its downwardly projecting discharge position (FIG. 2), the outer spout section 42 automatically retracts on the inner spout section 32, as a result of the link members 48, from the outwardly extending spout position (FIG. 1) to its retracted position (FIG. 2). As also apparent, the height H from the top end the conveyor 10 to the bottom end of the outer spout section 42 remains substantially constant due to the telescopic retraction of the outer spout section 42 on the inner spout section 32. While the simple connection of the outer spout section 42 to the conveyor housing 12 by the link members 48 is preferred, the telescopic movement of the outer spout section 42 can also be produced by other means such as by a combination of linkage arms or members and/or mechanical actuators or by an elongated fluid cylinder which is remotely controlled, preferably by the operator who controls the fluid cylinder actuator 15.

While the telescoping spout assembly 30 is ideally suited for use with the inclined discharge conveyor extending from a grain cart or wagon, the assembly may also be used with a grain conveyor extending from a combine or harvester to a grain cart or the discharge conveyor extending from a seed tender, whenever the extended lateral reach of the conveyor discharge is desired without significantly changing the unloading height of the spout assembly when it is pivoted downwardly from its extended upper position (FIG. 1) to its downwardly projecting retracted position (FIG. 2). It is also within the scope of the invention for the spout assembly to have a different cross-sectional profile other than the preferred rectangular profile described above. The retractable spout assembly 30 is movable between an extended position and a retracted position while unloading grain without losing substantial unloading height, which saves time for the total grain unloading operation and prevents collision damages.

While the form of telescoping flow control discharge spout assembly herein described constitutes a preferred embodiment of the invention, it is to be understood that the invention is not limited to this precise form of assembly, and that changes may be made therein without departing from the scope and spirit of the invention as defined in the appended claims.

What is claimed is:

1. A telescoping spout assembly for distributing a granular material from an elongated conveyor having a housing with a laterally projecting discharge portion defining an outlet and adapted to distribute grain from an incline discharge auger conveyor of a grain cart, said spout assembly comprising
   a tubular inner spout section pivotally connected to said discharge portion of said conveyor housing,
   a tubular outer spout section surrounds and slides over said inner spout section for telescopic movement relative to said inner spout section,
   a remotely controlled actuator for pivoting said inner spout section relative to said discharge portion of said conveyor housing, and
   an actuating member connecting said outer spout section to said conveyor housing and effective to telescope said outer spout section between a retracted position and an extended position relative to said inner spout section for providing increase lateral distribution of the granular material from said conveyor when said outer tubular section is in said extended position.

2. A spout assembly as defined in claim 1 wherein said actuating member comprises an elongated link member having one end portion pivotally connected to said discharge portion of said conveyor housing and an opposite end portion pivotally connected to said outer spout section.

3. A spout assembly as defined in claim 1 wherein said inner spout section and said outer spout section pivot as a unit in response to operation of said actuator.

4. A spout assembly as defined in claim 3 wherein said discharge portion of said housing projects at a substantial angle relative to a longitudinal axis of said conveyor.

5. A spout assembly as defined in claim 1 wherein said inner spout section and said outer spout section each have a rectangular profile in cross-section.

6. A spout assembly as defined in claim 1 wherein the vertical distance between the bottom of said outer spout section and the top end of said conveyor housing is substantially the same when said outer spout section is in said retracted position and in said extended position.

7. A spout assembly as defined in claim 1 wherein said inner spout section and said outer spout section are each tubular with a rectangular profile in cross-section.

8. A telescoping spout assembly for distributing a granular material from an elongated conveyor having a housing with a laterally projecting discharge portion defining an outlet and adapted to distribute grain from an incline discharge auger conveyor of a grain cart, said spout assembly comprising
   a tubular inner spout section pivotally connected to said discharge portion of said conveyor housing,
   a tubular outer spout section surrounds and slides over said inner spout section for telescopic movement relative to said inner spout section,
   a remotely controlled first actuator connected to pivot said inner spout section relative to said discharge portion of said conveyor housing, and
   a second actuator connecting said outer spout section to said conveyor housing and effective to telescope said outer spout section from a retracted position to an extended position relative to said inner spout section for providing increase lateral distribution of the granular material from said conveyor when said outer spout section is in said extended position.

9. A spout assembly as defined in claim 8 wherein said second actuator comprises an elongated link member connecting said outer spout section to said conveyor housing and effective to telescope said outer spout section between said retracted position and said extended position in response to pivoting movement of said inner spout section.

10. A spout assembly as defined in claim 9 wherein said elongated link member has one end portion pivotally connected to said discharge portion of said conveyor housing and an opposite end portion pivotally connected to said outer spout section.

11. A spout assembly as defined in claim 8 wherein said inner spout section and said outer spout section pivot as a unit in response to actuation of said first actuator.

12. A spout assembly as defined in claim 8 wherein said discharge portion of said housing projects at a substantial angle relative to a longitudinal axis of said conveyor.

13. A spout assembly as defined in claim 8 wherein said inner spout section and said outer spout section each have a rectangular profile in cross-section.

14. A spout assembly as defined in claim 8 wherein the vertical distance between the bottom of said outer spout section and the top end of said conveyor housing is substantially the same when said outer spout section is in said retracted position and in said extended position.

15. A telescoping spout assembly for distributing a granular material from an elongated conveyor having a housing with a laterally projecting discharge portion defining an outlet and adapted to distribute grain from an incline discharge auger conveyor of a grain cart, said spout assembly comprising an inner spout section pivotally connected to said discharge portion of said conveyor housing, an outer spout section supported by said inner spout section for telescopic movement relative to said inner spout section, a remotely controlled first actuator connected to pivot said inner spout section and said outer spout section relative to said discharge portion of said conveyor housing, a second actuator connected to said outer spout section and effective to telescope said outer spout section from a retracted position to an extended position relative to said inner spout section, and the vertical distance between the bottom of said outer spout section and the top end of said conveyor housing is substantially the same when said outer spout section is in said retracted position and in said extended position.

16. A spout assembly as defined in claim 15 wherein said outer spout section surrounds said inner spout section and slides over said inner spout section.

17. A spout assembly as defined in claim 15 wherein said inner spout section and said outer spout section each have a rectangular profile in cross-section.

* * * * *